United States Patent [19]
Carter

[11] 3,927,154
[45] Dec. 16, 1975

[54] PROCESS FOR PREPARING SINTERED URANIUM DIOXIDE NUCLEAR FUEL

[75] Inventor: Ralph E. Carter, Schenectady, N.Y.

[73] Assignee: General Electric Company, Schenectady, N.Y.

[22] Filed: Feb. 26, 1973

[21] Appl. No.: 336,022

Related U.S. Application Data

[63] Continuation of Ser. No. 85,727, Oct. 30, 1970, abandoned, which is a continuation-in-part of Ser. No. 749,994, Aug. 5, 1968, abandoned.

[52] U.S. Cl. .................. 264/.5; 252/301.1; 423/261
[51] Int. Cl.² .......................................... G21C 21/00
[58] Field of Search ............... 264/.5; 423/260, 261; 252/301.1 R

[56] References Cited
UNITED STATES PATENTS

| | | | |
|---|---|---|---|
| 3,194,852 | 7/1965 | Lloyd et al. | 264/.5 |
| 3,258,317 | 6/1966 | Brearton | 264/.5 |
| 3,342,562 | 9/1967 | St. Pierre | 423/261 |
| 3,375,306 | 3/1968 | Russell et al. | 264/.5 |

FOREIGN PATENTS OR APPLICATIONS

| | | |
|---|---|---|
| 647,103 | 8/1964 | Belgium |
| 970,735 | 9/1964 | United Kingdom |

*Primary Examiner*—Verlin R. Pendegrass
*Assistant Examiner*—Harold Tudor
*Attorney, Agent, or Firm*—Jane M. Binkowski; Joseph T. Cohen; Jerome C. Squillaro

[57] ABSTRACT

Uranium dioxide is prepared for use as fuel in nuclear reactors by sintering it to the desired density at a temperature less than 1300°C in a chemically controlled gas atmosphere comprised of at least two gases which in equilibrium provide an oxygen partial pressure sufficient to maintain the uranium dioxide composition at an oxygen/uranium ratio of at least 2.005 at the sintering temperature.

7 Claims, No Drawings

PROCESS FOR PREPARING SINTERED URANIUM DIOXIDE NUCLEAR FUEL

This is a continuation of application Ser. No. 85,727, filed Oct. 30, 1970, now abandoned, which is a Continuation-in-part of the then copending application Ser. No. 749,994 filed Aug. 5, 1968, now abandoned.

The present invention relates generally to the sintering art and is more particularly concerned with a novel method for producing sintered uranium dioxide nuclear fuel.

Uranium dioxide which is employed as fuel in civilian nuclear reactors is an exception to the law of definite proportions in that "$UO_2$" actually denotes a single, stable phase that may vary in composition from $UO_{1.7}$ to $UO_{2.25}$. As a practical matter, the industry has adopted a ratio of 2.00, which can be consistently produced in commercial operations. Reactors therefore are designed for fuels having an O/U ratio preferably of 2.00 but suitably as high as 2.01, and having a density of about 94 percent of the theoretical density.

It is the present general practice in the commercial production of such fuels to employ a sintering operation which involves firing a uranium dioxide green body or compact of $UO_2$ powder having an O/U ratio of approximately 2.15 at temperatures of 1650° to 1800°C in a hydrogen atmosphere to a final sinter product having an O/U ratio of about 2.00 and the required density. Such processing, however, necessitates a special electrically-heated furnace which is expensive to maintain.

Herefore, it has been proposed that uranium dioxide be sintered in a steam atmosphere in order to avoid the special high-temperature equipment requirements of the hydrogen firing operations. While this result can be obtained and the sintering rate can at the same time be substantially increased through the use of steam, this process has the disadvantage that the resulting sinter has an O/U ratio approximating 2.20. Thus, much of the advantage of steam over hydrogen is lost because the sinter product of the steam process must be further processed to bring the oxygen content within reactor specifications.

By virtue of the present invention, predicated upon the surprising discoveries subsequently to be described, the foregoing shortcomings of the prior art processes can be avoided. Thus, in accordance with this invention, a sinter product of uranium dioxide meeting reactor specifications can consistently be produced in a comparatively low-temperature furnace and without the additional firing step required by the steam atmosphere sintering process. Moreover, this new process of the invention is not accompanied by any significant offsetting disadvantage, the yield of good quality sinter product being at least as high as that heretofore obtainable in accordance with the best known prior art processes and there being no special preparation or subsequent treatment steps necessary or desirable in carrying out this new process.

One of the surprising discoveries underlying this new invention process is that a sinter product of uranium dioxide meeting reactor specifications both as to density and O/U ratio can be produced by firing compacts of uranium dioxide powder at temperatures hundreds of degrees below those which have been necessary for this purpose in accordance with prior art processes. Actually, temperatures below 1300°C are completely effective for this purpose and temperatures ranging down to 1000°C can produce satisfactory results without any significant processing time penalty so long as the O/U ratio of the uranium dioxide is maintained at a level of at least 2.005 during the sintering operation.

Another important discovery of mine is that the O/U ratio of uranium dioxide can readily be quickly established at the outset of the firing operation and can also be maintained throughout the sintering period by controlling the oxygen partial pressure of a mixture of gases under which the uranium dioxide compacts are sintered. Actually, only a small but critical amount of oxygen is required in the furnace atmosphere to produce this result and this amount can be provided readily by adjusting the ratio of one gas to another, such as carbon monoxide to carbon dioxide, and flowing the gas mixture continuously through the sintering chamber.

Briefly stated, the present process comprises sintering uranium dioxide to the desired density at a temperature lower than 1300°C in a chemically controlled gas atmosphere comprised of a predetermined ratio of at least two gases which in equilibrium provide an oxygen partial pressure sufficient to maintain the uranium dioxide composition at an O/U ratio of at least 2.005 at the sintering temperature.

Preferably, a sintering temperature ranging from about 1000° to 1250°C is used and the O/U ratio of uranium dioxide is maintained at a level preferably ranging from 2.005 to 2.01 at sintering temperature. The density of the present sintered uranium dioxide may range from about 92 to 96.9 percent of theoretical, and preferably, it is about 95 percent of theroretical.

In some instances, it may be desirable to maintain the O/U ratio of the uranium dioxide at a level higher than 2.01 at sintering temperature depending largely upon the particular manufacturing process and nuclear reactor. For example, it may be more suitable under the particular manufacturing process to produce a nuclear fuel having an O/U ratio as high as 2.195, and then later treating the sintering product in a reducing atmosphere to obtain the desired O/U ratio.

In the sintering of uranium dioxide, the particles do not melt but undergo solid state diffusion, i.e., the ionic motion of oxygen and uranium ions is sufficient at sintering temperatures so that diffusion occurs and the particles coalesce to the desired density. The uranium ions, however, move much more slowly than the oxygen ions thereby slowing down the sintering rate and requiring the high sintering temperatures of the past. While no limitation on the claims is intended, it is believed that the increased sintering rate of the present process can be explained on the basis of the movement of the ions in the uranium dioxide lattice network. In the instant process, it is believed that the oxygen present in the furnace atmosphere builds into the oxygen ion framework, thereby decreasing the number of vacancies in the oxygen lattice and increasing the number of vacancies in the uranium lattice. This increase in the concentration of vacancies in the uranium lattice increases the rate of diffusion of the uranium ions and hence increases the sintering rate.

The uranium dioxide particles used in the present sintering process may have a surface area ranging generally from about 2 to 12 square meters per gram in surface area. Such particles allow the sintering to be carried out within a reasonable length of time and at temperatures practical for commercial applications. Particles having a smaller surface area can be used but they require higher sintering temperatures whereas particles having a larger surface area are difficult to handle because of their high chemical reactivity.

Prior to sintering, the powder is compressed into a form in which it has the required mechanical strength for handling and which, after sintering, is of the size which satisfies or is close to reactor specification. Any conventional compression equipment can be used such as steel dies. For most applications the powder is compressed into pellets. A pressure of 20,000 to 50,000 psi is generally used to produce pellets with a density of about 50% of theoretical. A higher pressure does not produce pellets of higher density because the particles will not squeeze together further. If too little pressure is used, the pellets will not have the required mechanical strength.

A sintering furnace which is an atmosphere controlled furnace is used in the instant process so that only the desired gas atmosphere is present during sintering. Prior to sintering, the furnace should be flushed with an inert gas such as nitrogen to remove any entrained air which would affect the O/U ratio adversely. Unless the furnace is provided with introducing means such as gas locks which can place the uranium dioxide into the furnace without affecting its atmosphere, the uranium dioxide should be placed into the furnace prior to flushing with the inert gas.

In the present process, the sintering of the uranium dioxide is carried out in a specific gas atmosphere. The initial stoichiometry of the uranium dioxide used can vary, i.e., the O/U ratio can range from 1.7 to 2.25. This is possible because the uranium dioxide adjusts its stoichiometry to the furnace atmosphere during the sintering process. The furnace atmosphere is comprised of a predetermined ratio of at least two gases which in equilibrium provide oxygen in an amount sufficient to maintain the uranium dioxide at the desired O/U ratio during sintering. Representative of such a gas atmosphere is a mixture of carbon monoxide and carbon dioxide, a mixture of hydrogen and steam, and a mixture of all four of these components which can, if desired, be obtained from a combusted mixture of air and methane (natural gas).

The rate of heating to sintering temperature is not critical in the present process. Obviously, it should not be so rapid as to crack the green bodies, i.e., it should not be significantly in excess of the heating rates normally or usually used in commercial sintering furnaces. These heating rates range up to about 400°C per hour.

In the present process, the equilibrium gas mixture is flowed through the furnace. In this way, the furnace atmosphere is replenished continuously, so that the oxygen partial pressure is not significantly changed during sintering.

The specific partial pressure of oxygen to be maintained during the sintering process depends on the O/U ratio desired during sintering and the sintering temperature. It can be determined from the following equations where the relationship of $x$ in $UO_{2+x}$ vs. the partial pressure of oxygen is given.

$$\log_{10} P_{O_2} = A + B \log_{10} x + C (\log_{10} x)^2 \qquad (1)$$
$$A = -33{,}602 + 40.842 \times 10^{-3}T - 12.615 \times 10^{-6}T^2 \qquad (1a)$$
$$B = -9.983 + 18.021 \times 10^{-3}T - 5.387 \times 10^{-6}T^2 \qquad (1b)$$
$$C = -3.366 + 5.011 \times 10^{-3}T - 1.478 \times 10^{-6}T^2 \qquad (1c)$$

where $P_{O_2}$ = partial pressure of oxygen in atmospheres
$T$ = sintering temperature in degrees C.

Equations (1) through (1c) are based on data given in the following articles:

F. A. Kröger, "Search for a Defect Model for $UO_2$", Z. Fuer Physik Chemie 49, 178–197, 1966.

K. Hagemark and M. Broli, "Equilibrium Oxygen Pressures over the Non-Stoichiometric Uranium Oxides $UO_{2+x}$ and $U_3O_{8-z}$ at Higher Temperatures" J. Inorg. Nucl. Chem., 28, 2837–50 (1966).

From the partial pressure of $O_2$, the ratio of the specific gas mixture can be determined from the free energy equation $$\Delta F = -RT \ln K_p \qquad (2)$$

The free energies of formation $\Delta F$ are given in the literature.

For the reaction $$2 CO + O_2 \rightarrow 2CO_2$$

$$\Delta F = -135{,}100 + 41.50T = -RT \ln \left(\frac{p_{CO_2}}{p_{CO}}\right)^2 \frac{1}{p_{O_2}} \qquad (2a)$$

$$-135{,}100 + 41.50T = -RT \ln \left(\frac{p_{CO_2}}{p_{CO}}\right)^2 + RT \ln p_{O_2} \qquad (2b)$$

$$\log p_{O_2} = \log \left(\frac{p_{CO_2}}{p_{CO}}\right)^2 - \frac{135{,}100}{4.56T} + \frac{41.50}{4.56} \qquad (2c)$$

$$\log p_{O_2} = \log \left(\frac{p_{CO_2}}{p_{CO}}\right)^2 - \frac{29650}{T} + 9.10 \qquad (2d)$$

Substituting the known values of sintering temperature for T in degrees Kelvin and the known partial pressure of $O_2$ for $P_{O_2}$, the ratio of $(P_{CO_2}/P_{CO})$ is determined.

The gas mixture used in the present process provides a practical technique for getting the desired partial pressure of oxygen, which is very low, into the furnace atmosphere.

Using $CO_2/CO$ as an illustration, the gas reaction taking place in the furnace is

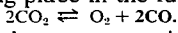
$$2CO_2 \rightleftarrows O_2 + 2CO.$$

Such a gas system is well buffered in that the carbon dioxide has the capacity to give up oxygen and the carbon monoxide can consume oxygen without significantly changing the partial pressure of the oxygen in the system. Should oxygen be consumed to change the O/U ratio of the uranium dioxide during the process, the $CO_2/CO$ ratio of the gases would not be significantly changed. Using a 1:1 ratio of $Co_2/CO$ as an example, the partial pressure of oxygen at 1400°C is calculated from equation 2(d) to be about $10^{-8}$ atmosphere. Such a partial pressure is equivalent to about 0.01 part of oxygen per million parts. Since there is no practical method of metering into the furnace 0.01 part of oxygen per million parts of gas, a mixture of oxygen and inert gas could not be used in the present process. It is very easy, however, to meter in a 1:1 mixture of $CO/CO_2$. In addition, if the mixture of oxygen and inert gas were used, the oxygen could be rapidly depleted by the uranium dioxide whereas the equilibrium gas mixture of the present process is well buffered and provides a substantially constant oxygen partial pressure.

The rate of cooling from sintering temperature is not critical in the present process. Obviously, it should not be so rapid as to crack the sintered bodies. The sintered uranium dioxide bodies are preferably cooled in the same atmosphere in which they were sintered.

In the following examples, unless otherwise noted, the procedure used was as follows.

The $CO_2/CO$ ratio in every run was designed to give a partial pressure of oxygen sufficient to maintain the O/U ratio of the uranium dioxide at 2.005 during sintering at the particular sintering temperature used.

The $CO_2/CO$ ratio was calculated from equation (2) using the oxygen partial pressure calculated from equation (1) or read from a graph on which equation (1) was based.

$CO_2$ and $CO$ of commercial purity were used. The gases were passed through calcium chloride and metered into the furnace by both conventional capillary and thermocouple flowmeters which were set approximately at the desired gas ratio. Specifically, the gases passed from the meters to the sintering furnaces, to an oxygen sensor, and then to a bubble blowoff which kept the entire assembly under about two inches of water pressure. In this way the oxygen sensor gave a continuous record of the oxygen activity of the sintering furnace atmosphere and was able to detect changes due to furnace outgassing and oxygen release or uptake by the sample.

An alumina tube furnace, about 20 inches in length and 1 ½ inch in diameter in diameter, platinum wound and electrically heated was used.

The flow of the $CO_2/CO$ gas mixture through the furnace was 150 ml/min.

The O/U ratio of the uranium dioxide was determined by oxidizing a weighed sample to $U_3O_8$ to constant weight at 750°C in air. The weight gain is the amount of oxygen taken up and knowing the molecular weight of $UO_{2+x}$ and $U_3O_8$ the value of $x$ was calculated. The sintered uranium dioxide was analyzed in the same manner except that the sample was crushed to —10 mesh prior to oxidation.

The density of the sintered uranium dioxide was measured by displacement in $CCl_4$ in g/cc.

The uranium powder was isostatically pressed at 10,000 psi, granulated to —20 mesh, tumbled for 5 min. in glass jars, and then pressed at 35,000 psi in a ⅝ inch die whose walls and plunger faces were lubricated with stearic acid. The green density of the final pressed pellets was 47% of theoretical.

All runs were carried out with the sample in platinum boats, which were heated to the desired sintering temperature in one hour and furnace cooled.

EXAMPLE 1

Uranium dioxide powder having a surface area of about 9 ½ square meters per gram and an O/U ratio of 2.19 was isostatically pressed to a green density of 47% of theoretical.

Two pellets were placed in the furnace which was then flushed with nitrogen for about 10 mintues to remove any entrained air. A mixture of carbon dioxide and carbon monoxide having a ratio of 4.13:1 was then flowed through the furnace which was then heated to a temperature of 1300°C and maintained at this temperature for 2 hours.

The resulting sintered pellets were allowed to cool to room temperature in the furnace atmosphere. The furnace was then flushed with nitrogen and the pellets were removed. The pellets had an average density of 95.9% of theoretical and an O/U ratio of 2.013.

The following tabulated runs of Table I were carried out in substantially the same manner as disclosed in Example 1. In Sample Series A to F the pellets were formed from the same uranium dioxide powder disclosed in Example 1. In Sample Series G to J the uranium dioxide powder had an O/U of 2.182 and a surface area of 3.62 square meters per gram. For each time period, the sample was comprised of two pellets, and the values given in Table I are the average of the two pellets.

TABLE I

| Sample Series | $CO_2/CO$ | Sintering Temp. °C | 1 hr | 2 hrs | 4 hrs | 8 hrs | 16 hrs |
|---|---|---|---|---|---|---|---|
| | | | Uranium Dioxide: O/U 2.19 and surface area of 9½ m²/gm | | | | |
| A | 255/1 | 900 | | O/U 2.195 den.93.8% | | | |
| B | 70.4/1 | 1000 | | O/U 2.119 den. 96.6% | | | |
| C | 27.9/1 | 1100 | | | O/U 2.052 den. 96.9% | | |
| D | 9.0/1 | 1200 | O/U 2.028 den.95.5% | O/U 2.006 den.95.2% | O/U 2.007 den.95.8% | | O/U 2.005 den. 96.4% |
| E | 4.13/1 | 1300 | O/U 2.011 den.95.5% | | O/U 2.008 den.95.7% | O/U 2.010 den.95.9% | |
| F | 1.60/1 | 1400 | | O/U 2.009 den.95.2% | | | |
| | | | Uranium Dioxide: O/U 2.182 and surface area of 3.62 m²/gm | | | | |
| G | 24/1 | 1100 | | O/U 2.040 den. 83% | | | |
| H | 8.7/1 | 1200 | | O/U 2.010 den.86.5% | | O/U 2.016 den.88.6% | |
| I | 3.7/1 | 1300 | O/U 2.010 den. 91% | O/U 2.009 den.92.6% | O/U 2.008 den.93.75% | O/U 2.006 den.94.55% | |
| J | 1.6/1 | 1400 | O/U 2.007 den. 94% | O/U 2.007 den. 94.5% | O/U 2.007 den. 94.9% | O/U 2.008 den.95.5% | |

Table I illustrates the good results obtainable by the present process after various periods of sintering at different temperatures. Specifically, the table shows that acceptable material can be made for present nuclear reactors at temperatures significantly below the temperatures now used in conventional processes using a hydrogen atmosphere.

The following tabulated runs of Table II were carried out in substantially the same manner as disclosed in Example 1, and the uranium dioxide powder used was the same as disclosed in Example 1. The powder was isostatically pressed under 30,000 psi to form pellets having a green density of about 45 percent of theoretical. In Table II each sample was initially heated for the specified period of time and temperature to strip off excess oxygen in the same furnace atmosphere used for sintering. Such a stripping procedure would not be necessary in conventional sintering furnaces having heating rates of about 400°C or below. The sample of each sintering operation was comprised of two pellets, and the properties of the sintered product given in Table II are the average of the two pellets.

TABLE II

| Sample Series | $CO_2/CO$ | Heat to Strip Off Excess Oxygen | Sintering Operation Time and Temperature | Properties of Sintered Product % Density | O/U |
|---|---|---|---|---|---|
| H | 99/1 | 2 hrs. at 500°C | 4 hours at 1000°C | 92.3 | 2.01 |
| I | 99/1 | ½ hr. at 415°C | 5 ¾ hrs. at 1000°C | 94.2 | 2.008 |
| J | 27.9/1 | ½ hr. at 400°C | 4 hours at 1100°C | 92.4 | 2.012 |

Table II illustrates that uranium dioxide fuel meeting the density and oxygen to uranium ratio requirements of present nuclear reactors can be made by the present process at sintering temperatures significantly below the sintering temperatures now used in conventional processes.

What I claim as new and desire to secure by Letters Patent of the United States is:

1. A sintering control process wherein the sintering atmosphere contains substantially contantly a predetermined monitored oxygen partial pressure which maintains a body consisting essentially of uranium dioxide at a preselected oxygen to uranium ratio during sintering of such body in the production of a uranium dioxide nuclear fuel body having said preselected oxygen to uranium ratio comprising the steps of providing uranium dioxide particles having an oxygen to uranium atomic ratio of 1.7 to 2.25 and a surface area ranging from about 2 to 12 square meters per gram, pressing said uranium dioxide particles to form a green body, heating said green body to a sintering temperature ranging from about 1000°C to 1400°C in a chemically buffered sintering gas atmosphere consisting essentially of a gas mixture of at least two gases, which are maintained in a ratio which in equilibrium at said sintering temperature provides said predetermined monitored oxygen partial pressure to maintain the uranium dioxide at said preselected oxygen to uranium ratio during sintering, and sintering said body at said temperature, said oxygen partial pressure being solely predetermined by said preselected oxygen to uranium ratio and said sintering temperature, said preselected oxygen to uranium ratio being a minimum of 2.005, and said sintering being carried out to produce a sintered body of uranium dioxide having a density of at least about 92 percent of theoretical.

2. A process according to claim 1 wherein said gas mixture consists essentially of carbon monoxide and carbon dioxide.

3. A process according to claim 1 wherein said gas mixture consists essentially of hydrogen and steam.

4. A process according to claim 1 wherein said gas mixture is formed from combusted air and methane.

5. A process according to claim 1 wherein said sintering temperature ranges from aoubt 1000°C to 1250°C, said oxygen to uranium ratio ranges from 2.005 to 2.01, and said density ranges from about 92 to 96.9 percent of theoretical.

6. A process according to claim 1 wherein said oxygen to uranium ratio ranges from 2.005 to 2.05.

7. A sintering control process which produces a sintered nuclear fuel body of uranium dioxide having a preselected oxygen to urnaium ratio which ranges from 2.005 to 2.05 and a density of at least about 92% of theoretical which comprises the steps of preselecting said oxygen to uranium ratio for said sintered body of uranium dioxide, preselecting a sintering temperature from the range of about 1000°C to 1400°C, calculating the required oxygen partial pressure to be maintained substantially constantly at said preselected sintering temperature to produce said sintered body having said preselected oxygen to uranium ratio, said required oxygen partial pressure being solely determined by said preselected sintering temperature and said preselected oxygen to uranium ratio of said sintered product, providing a gas mixture of at least two gases which in equilibrium produces a partial pressure of oxygen, calculating from said calculated required oxygen partial pressure and said preselected sintering temperature the required ratio of gases in said gas mixture which in equilibrium at said sintering temperature produces said required partial pressure of oxygen, providing a sintering gas atmosphere consisting essentially of said gas mixture which in equilibrium at said sintering temperature produces said required oxygen partial pressure, providing uranium dioxide particles having an oxygen to uranium ratio of 1.7 to 2.25 and a surface area ranging from about 2 to 12 square meters per gram, pressing said uranium dioxide particles to form a green body, heating said green body in said sintering gas atmosphere to said preselected sintering temperature, sintering said body to said density, monitoring the oxygen partial pressure of said sintering atmosphere during sintering and maintaining said calculated required oxygen partial pressure in said sintering atmosphere substantially constantly at said preselected temperature by adjusting the equilibrium of said gas mixture by adjusting said gas mixture ratio.

* * * * *